RECEIVER SPECTRUM DIAGRAMS
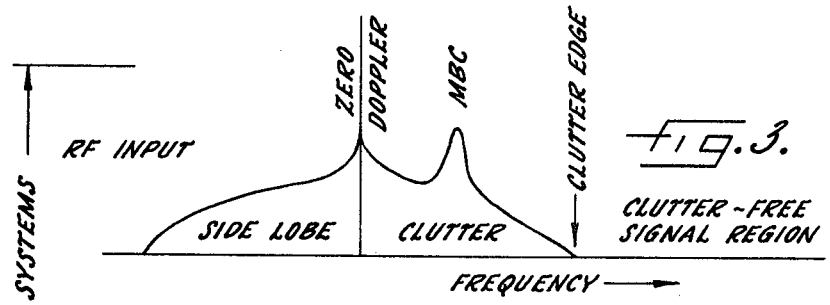
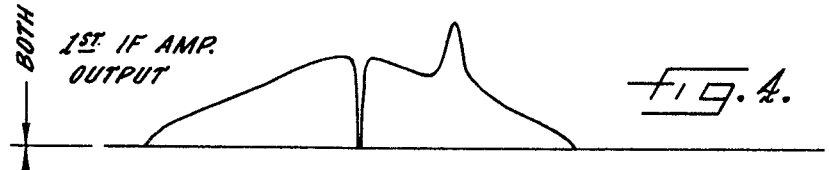
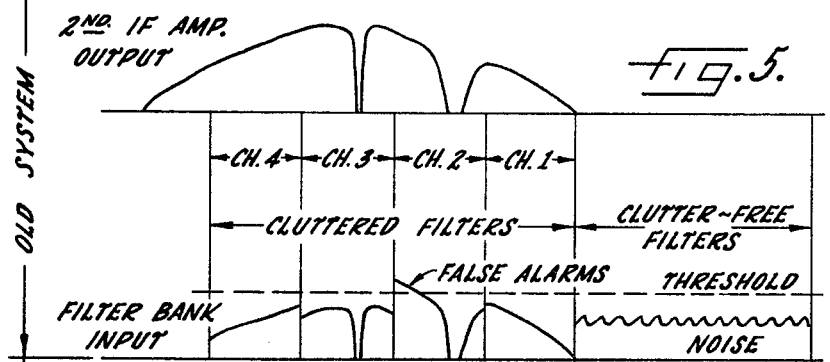
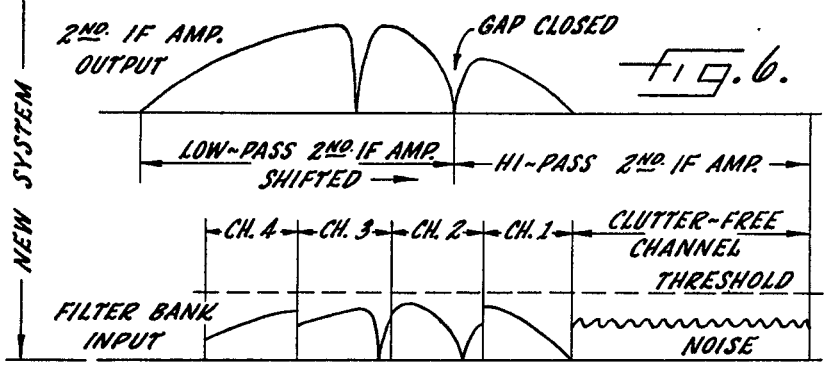
INVENTOR.
Keefer S. Stull, Jr.
BY
H. H. Losche
ATT'YS.

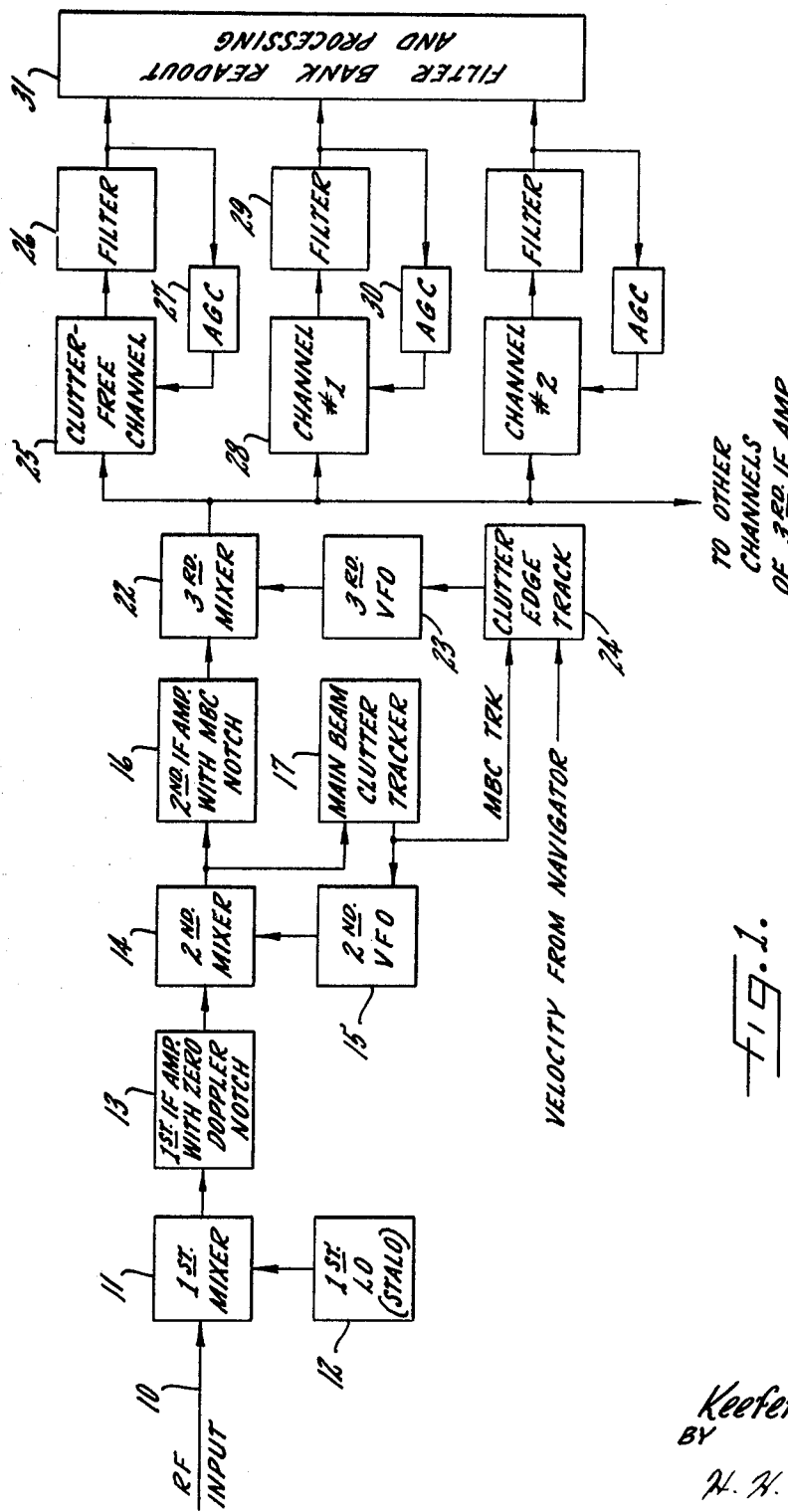

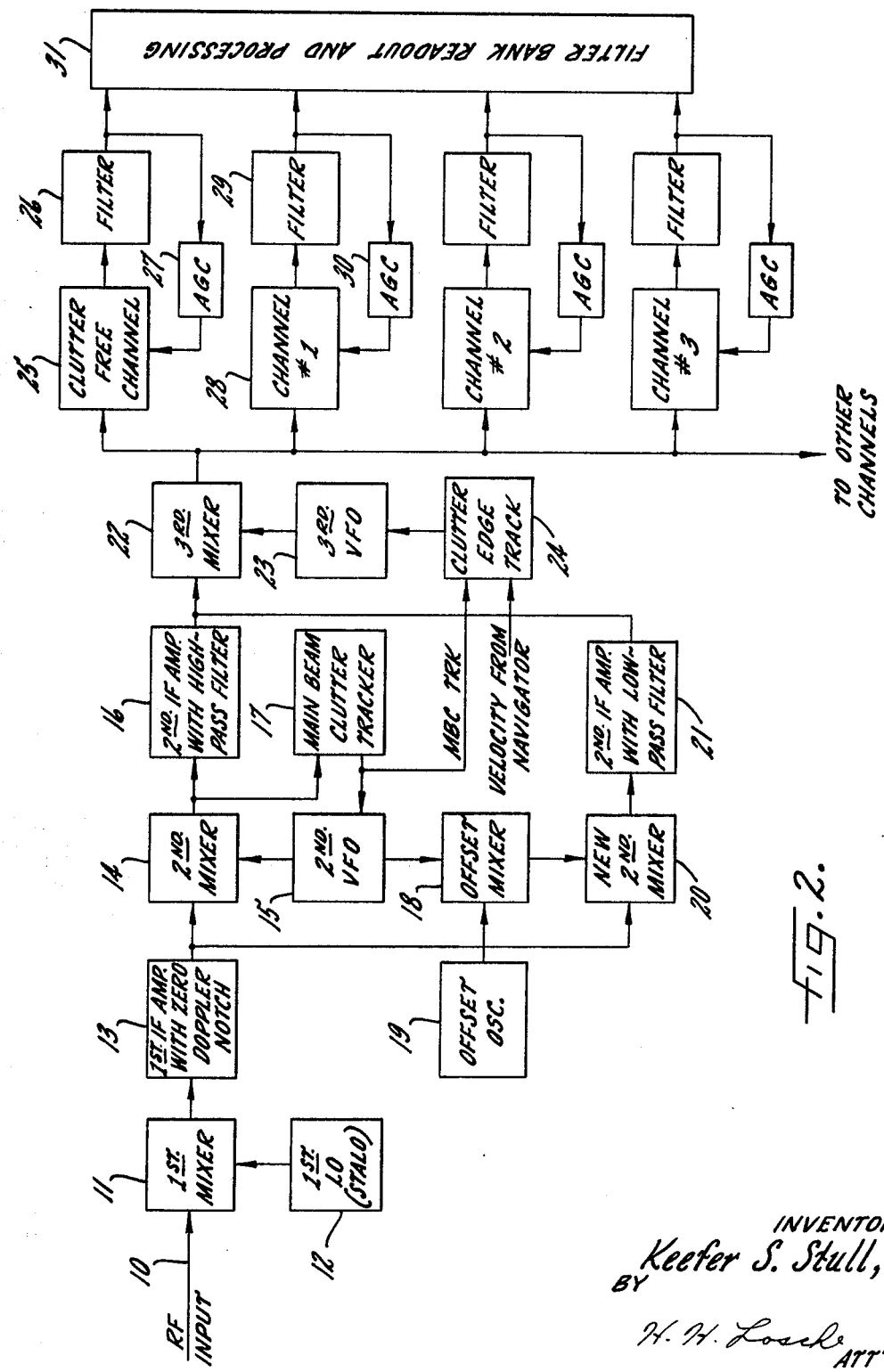

United States Patent Office 3,267,468
Patented August 16, 1966

3,267,468
PULSE DOPPLER CLUTTER REJECTION SYSTEM
Keefer S. Stull, Jr., Baltimore, Md., assignor, by mesne assignments, to the United States of America as represented by the Secretary of the Navy
Filed Jan. 15, 1965, Ser. No. 425,974
7 Claims. (Cl. 343—7.7)

This invention relates to a pulse Doppler clutter rejection radar system and more particularly to a Doppler clutter rejection circuit incorporated in the radar receiver intermediate frequency stages to reduce all side-lobe, main beam, and ground return clutter to amplitudes below a predetermined threshold.

When an airborne pulse Doppler radar transmits a beam from the antenna which intersects the surface of the earth, a strong echo is received, the energy of which is concentrated in a relatively narrow bandwidth centered about the Doppler frequency corresponding to the velocity of the airplane relative to the point on the earth intersected by the beam. This signal, known as main beam clutter (MBC), can be so much stronger than the side-lobe clutter and the desired target signals that it can saturate the receiver resulting in loss of the desired target signals and in the generation of false targets. To eliminate these undesirable false target effects it has been customary to mechanize the receiver in such a way that the MBC is made to fall in the rejection band of a notch filter by means of utilizing a clutter tracking circuit in the intermediate frequency (IF) circuits. This effectively eliminates the saturation effects but it introduces a new problem in those receivers where the amplifier, which drives a filter-bank for readout, is divided into several narrow-band IF channels, each with its own automatic gain control (AGC) circuit. Normally, the noise or clutter spectrum is fairly evenly distributed over each channel, and the AGC circuit of each channel adjusts the gain so that the noise or clutter in each corresponding filter of the filter-bank is a few decibels below a signal detection threshold level. However, the channel in which the MBC notch appears will have an appreciable part of the clutter spectrum missing. The AGC circuit will boost the level of the remaining clutter to make up for the lost portion of the spectrum and at these higher levels the clutter will reach the signal threshold and produce false alarms or pulse signals.

In the present invention, the IF stages of the radar receiver are further modified wih an additional mixer and amplifier to eliminate this effect of creating a gap in the clutter spectrum. Instead of using a notch filter, a low-pass filter is used to pass the signals on the low side of the MBC and a high-pass filter is used to pass signals on the high side of the MBC, neither filter passing the MBC. The outputs of these two filters are coupled to separate mixers which have local oscillating frequencies that differ from each other by an amount equal to the difference between the cutoff frequencies of the two filters. The outputs of the two mixers are then added and coupled through a conventional Doppler amplifier to the filter bank and filter bank readout circuits. The net effect of these two operations is to remove the part of the Doppler spectrum containing the MBC and then to translate the remaining two parts of the Doppler spectrum toward each other to fill in this spectrum gap. It is accordingly a general object of this invention to provide a pulse Doppler radar with an improved IF circuit to minimize or eliminate the side-lobe ground return and MBC without producing a spectrum gap capable of producing false targets and to allow targets to appear in this clutter Doppler band without saturating the radar receiver.

These and other objects and the attendant advantages, features, and uses of this invention will become more apparent to those skilled in the art as the description proceeds in a more detailed explanation when taken along with the accompanying drawings, in which:

FIGURE 1 is a block circuit schematic of the IF component fo a typical pulse Doppler radar receiver system;

FIGURE 2 is a circuit schematic of the IF component of a pulse Doppler radar including the elements modifying the circuit of FIGURE 1; and FIGURES 3, 4, 5, and 6 illustrate clutter spectrum at various terminal points of the circuit schematic of FIGURES 1 and 2, FIGURES 5 and 6 further illustrating the channel division of this Doppler clutter spectrum.

Referring more particularly to FIGURE 1 with occasional reference to FIGURES 3, 4, and 5, there is illustrated a block circuit schematic of the IF component in a pulse Doppler radar receiver system in which the radio frequency (RF) is applied by way of the conductor input 10 to the first IF mixer 11. A first stable local oscillator 12 also applies a frequency to the first mixer 11 thereby producing the first IF. The output of the first mixer 11 is coupled to a first IF amplifier which includes therein a zero Doppler notch filter. The RF input on conductor 10 produces a Doppler spectrum of side-lobe clutter, transmitter leak-through clutter, altitude return clutter, and MBC as shown in the Doppler frequency spectrum of FIGURE 3. The spectrum of FIGURE 3 is amplified in the first IF amplifier 13 and, since the first local oscillator 12 is stable, the zero Doppler will be stable such that the zero Doppler notch filter can remove this transmitter leak-through and ground return clutter from the clutter spectrum on the output of the first IF amplifier 13, as shown by FIGURE 4. The output of the first IF amplifier 13 is coupled as an input to a second mixer 14 that is heterodyned with a variable frequency applied thereto from a second variable frequency oscillator 15 to produce the second IF. The output of the second mixer 14 is applied in common to a second IF amplifier with an MBC notch filter therein and to an MBC tracker circuit 17, the output of the tracker circuit being applied to control the frequency of the second variable frequency oscillator 15. Since the local oscillator is a variable frequency oscillator which is controlled by the MBC tracking loop such that the MBC always falls at a fixed frequency in the second IF amplifier, this MBC can also be filtered out by the fixed MBC notch filter in the amplifier 16. This is shown in FIGURE 5 where the MBC has been completely eliminated from the Doppler frequency side-lobe clutter spectrum. The output of the second IF amplifier 16 is applied to a third mixer 22 to which is heterodyned the frequency from a third variable frequency oscillator 23 under the control of a clutter edge tracking circuit 24. The clutter edge tracking circuit has the MBC tracker output applied thereto as well as velocity input from the aircraft navigator, or the like, to control the frequency output of the variable frequency oscillator 23. The third IF amplifier consists of a plurality of channels, the first of which is a clutter-free channel 25 with the output being conducted through a channel filter 26. The clutter-free channel will be established at a fixed band of frequency by the clutter edge tracking circuit. This channel output is fed back through an AGC circuit 27 to the clutter-free channel 25 to control the amplitude of the signals passing therethrough to be maintained below the threshold of receiver noise. That is, this clutter-free channel is AGC'd on noise. In like manner channel number 1 IF amplifier, identified by the reference character 28, is in series with a filter 29 and an AGC circuit 30 in a feedback loop is coupled to the channel number 1 amplifier 28. Other IF channels are coupled in like manner in parallel to the output of the third mixer 22, and the output of all of these channels are coupled to a filter-bank readout and processing circuit 31, as well understood by those skilled in the art and further described in the text of Introduction to Radar System, by Merrill I. Skolnik, 1962, section 4.9. In systems shown by FIGURE 1, each third IF channel passes equal bandwidth portions of side-lobe clutter and each channel is AGC'd by the clutter level in its channel. As shown in FIGURE 5, channel 2 accepts and passes the portion of the Doppler frequency in which the notch filter has eliminated the MBC. In this channel 2, where the MBC notch has removed such a large amount of clutter energy, the AGC will turn up the gain in that channel to a point where the remaining clutter will rise above the threshold level and cause excessive false alarms or false targets to appear in the filter bank readout 31. This, of course, produces false signals at the indicator for radar personnel which may cause tracking of a false target and waste of extremely valuable time where enemy action is to be tracked and evaluated.

Referring more particularly to FIGURE 2, there is illustrated the greater part of the circuit of FIGURE 1 with like reference characters being applied to like parts in FIGURE 1. The FIGURE 1 IF circuit is modified in FIGURE 2 by adding an offset mixer 18, an offset oscillator 19, a supplemental second mixer 20, and a supplemental second IF amplifier 21. Further, in the modification in the circuit of FIGURE 1, the second IF amplifier 16 includes a high-pass filter in place of the MBC notch filter, as shown in FIGURE 1. The supplemental second IF amplifier includes a low-pass filter to reject all clutter above and including the MBC, shown in FIGURES 3 and 4. The high-pass filter in the second IF amplifier 16 is designed to reject all clutter below and including the MBC, the low-pass filter and the high-pass filter covering the parts of the Doppler clutter spectrum as shown in FIGURE 6. The offset oscillator 19 applies a frequency to the offset mixer 18 together with the variable frequency output from the second variable frequency oscillator 15 to shift the IF frequency in the low-pass channel higher by an amount equal to the bandwidth of the MBC. This offset IF frequency being produced as an output to the second supplemental mixer 20 will vary in accordance with the shift of MBC frequency in the Doppler clutter spectrum. This shift, by the offset frequency of mixer 18 for the width of the MBC, is such that when the outputs of the second IF amplifier 16 and the supplemental second IF amplifier 21 are combined for application to the third mixer 22 to produce a Doppler clutter spectrum, the MBC gap is closed, as shown in FIGURE 6. In this manner the AGC control based on the clutter area within its channel will adjust the gain of this clutter level in the third IF amplifier channel 2 to a level below threshold thereby eliminating any possibility of producing false alarms by the circuit of FIGURE 1, as shown in FIGURE 5. Any real targets, which may be approaching to or receding from the platform, such as an aircraft, on which the present radar receiver is supported, which is sufficiently slow in its opening or closing directions to come within the side-lobe clutter frequency spectrum, as shown in FIGURE 3, would exceed the threshold and appear as a target on the indicator from the readout of the filter bank 31 and would not be buried in the side-lobe or MBC clutter to hide the target from detection by the radar. It may be understood that such real targets would appear since they produce high amplitude pulses which are too rapid for the AGC circuits to average as they average the clutter spectrum. Accordingly, real targets can now be detected in the side-lobe clutter spectrum as well as in the clutter-free portion of the Doppler frequency spectrum in which only receiver noise is present, clearly indicating all real targets and completely eliminating or materially minimizing all false targets produced in the Doppler frequency spectrum area.

While many modifications and changes may be made in the constructional details and features of this invention without departing from the spirit and scope of the invention, I desire to be limited only by the scope of the appended claims.

I claim:

1. A pulse Doppler clutter rejection system for a pulse Doppler radar having first, second, and third local oscillators, first, second, and third mixers, and first, second, and third intermediate frequency amplifiers, the latter of which is frequency divided into a plurality of frequency bands for target detection, comprising:

a supplemental second mixer and supplemental second intermediate frequency amplifier coupled in parallel to said second mixer and second intermediate frequency amplifier;

an offset mixer coupled to and controlled by said second local oscillator with an output coupled to said supplemental second mixer;

an offset oscillator coupled to said offset mixer to mix the oscillations therefrom with the oscillations of said second local oscillator; and a high-pass filter in said second intermediate frequency amplifier and a low-pass filter in said supplemental intermediate frequency amplifier to pass frequencies above and below an undesirable band of frequencies on a common output to said third mixer whereby the offset oscillator produces oscillations sufficient to close the gap in the intermediate frequency Doppler spectrum caused by said high-pass and low-pass filters equal to said undesirable frequency thereby eliminating clutter frequencies.

2. A pulse Doppler clutter rejection circuit for a pulse Doppler radar having first, second, and third local oscillators, mixers, and intermediate frequency amplifiers between a radio frequency input and a plurality of frequency channels in the third intermediate frequency amplifier outputs, comprising:

a supplemental second mixer and a supplemental second intermediate frequency amplifier coupled in parallel to said second mixer and second intermediate frequency amplifier;

a high-pass filter coupled to said second intermediate frequency amplifier to pass frequencies above an undesirable cluttered frequency band and a low-pass filter coupled to said supplemental second intermediate frequency amplifier to pass frequencies below said undesirable cluttered frequency band; and means coupled to said supplemental second mixer for displacing the frequency of said supplemental second intermediate frequency amplifier output to overlap said undesirable cluttered frequency band to provide a continuous intermediate frequency band passed by said high-pass filter and low-pass filter to said third mixer whereby said undesirable cluttered frequency band is eliminated.

3. A pulse Doppler clutter rejection circuit as set forth in claim 2 wherein said means is an offset oscillator and an offset mixer coupled to said offset oscillator and to said second local oscillator to mix the frequencies thereof, said offset mixer having an output coupled to said supplemental second mixer to mix the frequency from said first intermediate frequency amplifier and the mixed frequencies of said second mixer and offset oscillator for said supplemental second intermediate frequency amplifier.

4. A pulse Doppler cutter rejection circuit for a pulse Doppler radar having first, second, and third mixers, a first intermediate frequency amplifier with a zero Doppler notch filter therein between said first and second mixers, a second intermediate frequency amplifier between said second and third mixers, a first local oscillator coupled to said first mixer together with an input of radio frequency signals, second and third variable frequency oscillators coupled respectively to said second and third mixers, a main-beam clutter tracker coupled to said second variable frequency oscillator to control same, and a clutter edge tracker coupled to said third variable frequency oscillator to control same, the invention which comprises:
- a supplemental second mixer and supplemental second intermediate frequency amplifier serially coupled in parallel to said second mixer and second intermediate frequency amplifier;
- a high-pass filter coupled to said second intermediate frequency amplifier to pass frequencies above the main-beam clutter frequency band received through said radio frequency input;
- a low-pass filter coupled to said supplemental second intermediate frequency amplifier to pass frequencies below said main-beam clutter frequency band; and
- means coupled to said supplemental second mixer for shifting the intermediate frequency in said supplemental second intermediate frequency amplifier to overlap said main-beam clutter frequency band to provide a continuous intermediate frequency band passed by said high-pass filter and low-pass filter to said third mixer whereby said main-beam clutter frequency band is rejected.

5. A pulse Doppler clutter rejection circuit as set forth in claim 4 wherein
said means includes an offset oscillator coupled to an offset mixer, said offset mixer being coupled to mix the oscillations of said second variable frequency oscillator and said offset oscillator on an output to said supplemental second mixer to produce the intermediate frequency overlapping said main-beam clutter frequency.

6. A pulse Doppler clutter rejection circuit for the intermediate frequency component of a pulse Doppler radar having a first mixer input and a third mixer output of the intermediate frequency component, the invention which comprises:
- a first intermediate frequency amplifier coupled to said first mixer with a zero Doppler notch filter to filter out a small band of frequencies of which zero Doppler frequency is the center frequency;
- a second mixer and a supplemental second mixer having an input each coupled in parallel to the output of said first intermediate frequency amplifier and notch filter;
- an offset oscillator coupled to one input of an offset mixer;
- a second variable frequency oscillator having a controlling input and an output coupled in common to said second mixer and to said offset mixer, said offset having an output coupled as a second input to said supplemental second mixer;
- a second intermediate frequency amplifier with a high-pass filter therein to pass frequency signals above the frequency of the main-beam clutter and a main-beam clutter tracker circuit being coupled in common to the output of said second mixer, the output of said main-beam clutter tracker circuit being coupled to said controlling input of said second variable frequency oscillator and the output of said second intermediate frequency amplifier being coupled to said third mixer; and
- a supplemental second intermediate frequency amplifier with a low-pass filter therein to pass frequency signals below the frequency of the main-beam clutter frequency coupled between said supplemental second mixer and said third mixer whereby said notch filter eliminates the altitude return and transmitter leakage frequencies, said high- and low-pass filters pass frequency signals above and below main-beam clutter signal frequency, and said offset oscillator and offset mixer produce intermediate frequency to the amount of said main-beam clutter frequency to reject same providing a continuous intermediate frequency band on the output of said third mixer.

7. A pulse Doppler clutter rejection circuit for the intermediate frequency component of a pulse Doppler radar receiver having the radio frequency input to the component through a first mixer and the intermediate frequency output taken from a third mixer through a plurality of intermediate frequency amplifier channels, the invention which comprises:
- a first intermediate frequency amplifier coupled to said first mixer with a zero Doppler notch filter therein to produce an amplified intermediate frequency devoid of transmitter leakage and ground return signals on an output thereof;
- a second mixer and a supplemental second mixer, each having one of two inputs coupled in common to the output of said first intermediate frequency amplifier and each having an output;
- a second variable frequency oscillator having a controlling input and an output coupled as the second input to said second mixer to produce a second intermediate frequency;
- an offset oscillator having an output;
- an offset mixer having one input coupled to the output of said offset oscillator and a second input coupled to the output of said second variable frequency oscillator to produce variable offset frequency on an output thereof, said output being coupled to the second of said two inputs to said supplemental second mixer;
- a second intermediate frequency amplifier with a high-pass filter therein and a main-beam clutter tracking circuit coupled in common to the output of said second mixer, the output of said tracking circuit being coupled to the controlling input of said second variable frequency oscillator to vary the frequency thereof in accordance with the tracking of said main-beam clutter; and
- a supplemental second intermediate frequency amplifier with a low-pass filter therein coupled to the output of said supplemental second mixer and having an output coupled in common to the output of said second intermediate frequency amplifier, the common output coupling being coupled as an input to said third mixer whereby the offset intermediate frequency closes the frequency gap caused by filtering out the main-beam clutter and the main-beam clutter is rejected from the clutter signal band of intermediate frequency.

References Cited by the Applicant

UNITED STATES PATENTS 2,427,691    9/1947    Prichard.
2,785,301    3/1957    Philpott.

CHESTER L. JUSTUS, *Primary Examiner.*

R. D. BENNETT, *Assistant Examiner.*